United States Patent
Aso

(10) Patent No.: US 8,079,716 B2
(45) Date of Patent: Dec. 20, 2011

(54) IMAGE PROCESSING SYSTEM, PROJECTOR, METHOD AND COMPUTER PROGRAM PRODUCT

(75) Inventor: Satoshi Aso, Ibaraki (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 12/186,662

(22) Filed: Aug. 6, 2008

(65) Prior Publication Data

US 2009/0040396 A1 Feb. 12, 2009

(30) Foreign Application Priority Data

Aug. 7, 2007 (JP) ................................. 2007-205235

(51) Int. Cl.
G03B 21/14 (2006.01)

(52) U.S. Cl. ................ 353/69; 353/30; 353/31; 353/70; 353/101; 348/136; 348/827; 348/222.1; 348/745; 348/746

(58) Field of Classification Search ............... 353/30, 353/31, 69, 70, 101; 382/254, 266, 260, 382/295, 305, 255; 348/136, 827, 222.1, 348/744, 745, 746; 345/87, 204
See application file for complete search history.

(56) References Cited

U.S. PATENT DOCUMENTS

| | | | |
|---|---|---|---|
| 5,865,521 A * | 2/1999 | Hashizume et al. ............ 353/38 |
| 6,367,933 B1 | 4/2002 | Chen et al. |
| 6,597,410 B1 * | 7/2003 | Doany et al. .................. 348/744 |
| 6,811,264 B2 * | 11/2004 | Raskar et al. .................. 353/94 |
| 6,947,610 B2 * | 9/2005 | Sun .............................. 382/293 |
| 6,974,217 B2 * | 12/2005 | Kimura et al. ................. 353/69 |
| 7,003,172 B2 * | 2/2006 | Takeuchi et al. ............. 382/254 |
| 7,270,421 B2 * | 9/2007 | Shinozaki ...................... 353/69 |
| 2003/0206277 A1 * | 11/2003 | Eiiri et al. ...................... 353/31 |
| 2003/0210381 A1 * | 11/2003 | Itaki .............................. 353/70 |
| 2005/0041216 A1 * | 2/2005 | Kobayashi .................... 353/69 |
| 2005/0105057 A1 * | 5/2005 | Matsuda et al. ............... 353/70 |
| 2005/0162624 A1 * | 7/2005 | Miyasaka .................... 353/101 |
| 2005/0243286 A1 * | 11/2005 | Kobayashi .................... 353/69 |
| 2006/0187421 A1 | 8/2006 | Hattori et al. |
| 2007/0046901 A1 * | 3/2007 | Kuno ............................ 353/69 |

FOREIGN PATENT DOCUMENTS

| | | |
|---|---|---|
| JP | 2003-029714 | 1/2003 |
| JP | 2005-099680 A | 4/2005 |
| JP | 2005-159425 A | 6/2005 |
| JP | 2007-143173 A | 6/2007 |

* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

An image processing system includes a determination unit that determines a distortion state of a projected image, and a correction unit that performs distortion correction of the image according to the distortion state, wherein the correction unit performs distortion correction calculation using either an intersection point of diagonal lines of the image after distortion correction in a display area of an optical modulator or a center of gravity of the image as the origin.

4 Claims, 4 Drawing Sheets

US 8,079,716 B2

IMAGE PROCESSING SYSTEM, PROJECTOR, METHOD AND COMPUTER PROGRAM PRODUCT

CROSS REFERENCE TO RELATED APPLICATIONS

The present application claims priority and incorporates herein by reference in its entirety Japanese Patent Application No. 2007-205235 filed Aug. 7, 2007.

BACKGROUND

It is necessary for a projector to correct distortion of projected images for appropriate image display. For example, as disclosed in Japanese Patent Publication No. JP-A-2003-29714, a projector may perform distortion correction calculation using image information of input images. As an origin for the distortion correction calculation, for easy calculation, the midpoint of the lower side of a display area (liquid crystal panel) or the point at the upper left of the display area is used as disclosed in Japanese Patent Publication No. JP-A-2003-29714.

However, when the midpoint of the lower side of the display area is used as the origin, the distances to the upper left and the upper right of the image after distortion correction become longer, and, when the point at the upper left of the display area is used, the distance to the lower right of the image after distortion correction becomes longer. The longer the distance from the origin, the further an error of distortion correction calculation increases. On this account, when an image having a laterally symmetric pattern, an image having a vertically symmetric pattern, an image with moire, or the like is projected using these methods, part of the patterns and moire are observed in a distorted condition.

SUMMARY

An advantage of some aspects of the invention is to provide an image processing system, a projector, a program, and an information storage medium by which, even when an image having a laterally symmetric pattern or the like is projected, an image without distorted pattern or the like can be projected.

An image processing system according to an aspect of the invention includes a determination unit that determines a distortion state of a projected image, and a correction unit that performs distortion correction of the image according to the distortion state, wherein the correction unit performs distortion correction calculation using either an intersection point of diagonal lines of the image after distortion correction in a display area of an optical modulator or a center of gravity of the image as the origin.

Further, a projector according to an aspect of the invention includes the above described image processing system and a projection unit that projects the image after distortion correction by the correction unit.

Furthermore, a program according to an aspect of the invention allows a computer to perform the function of determining a distortion state of a projected image, and correcting the distortion of the image according to the distortion state, wherein the distortion correction calculation uses either an intersection point of diagonal lines of the image after distortion correction in a display area of an optical modulator or a center of gravity of the image as the origin.

According to some aspects of the invention, since the image processing system or the like performs distortion correction calculation with the intersection point of diagonal lines of the image or the like as the origin, it can perform the calculation nearly in the laterally and vertically symmetric condition with respect to the origin. Therefore, the calculation error can be reduced and the image without distortion of pattern or the like can be generated. Further, according to some aspects of the invention, since the intersection point of the diagonal lines of the image or the like corresponds to a position near the center of the projected image, the projector or the like performs distortion correction calculation with the intersection point of diagonal lines of the image or the like as the origin, and thereby, it can project even an image having a laterally and horizontally symmetric pattern while maintaining the symmetry.

Additionally, the correction unit may perform the distortion correction calculation after moving the image after distortion correction within the display area so that the origin may coincide with a center of the display area.

Thereby, the image processing system or the like can reduce the amount of calculation and perform more efficient calculation by performing distortion correction calculation while making the origin coincide with the center of the display area.

BRIEF DESCRIPTION OF THE DRAWINGS

Embodiment of the disclosure is described with reference to the accompanying drawings, wherein like numbers reference like elements.

DESCRIPTION OF EXEMPLARY EMBODIMENTS

Hereinafter, embodiments in which the invention is applied to projectors will be described with reference to the drawings. The following embodiments do not impose any limitations on the description of the invention described in claims. Further, all of the configurations shown in the following embodiments are not necessarily essential as solving means for the invention described in claims.

First Embodiment

Figure 1:
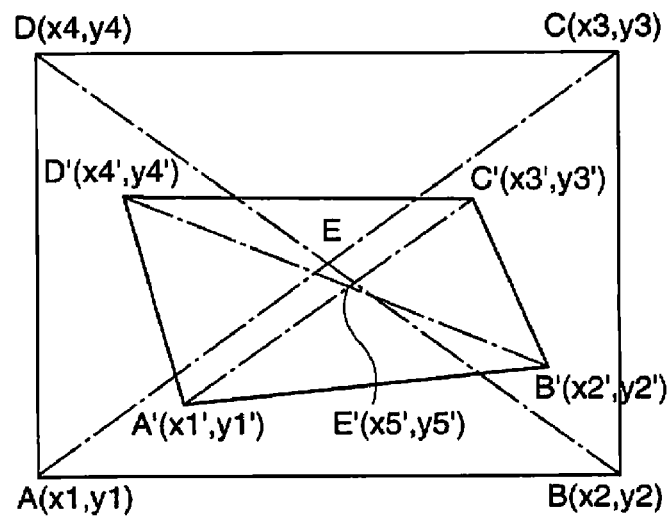
FIG. 1 shows an image after distortion correction in a liquid crystal panel when an intersection point of diagonal lines is used as an origin.

FIG. 1 shows an image after distortion correction in a liquid crystal panel when the intersection point of diagonal lines is used as an origin. Generally, the shape of an image before distortion correction conforms to the shape of the liquid crystal panel which is a kind of a display area of an optical modulator. The coordinates on the four corners of the liquid crystal panel are denoted by $A(x1,y1)$, $B(x2,y2)$, $C(x3,y3)$, $D(x4,y4)$ in the counterclockwise direction from the lower left, and the intersection point of the diagonal lines of the liquid crystal panel is denoted by E. Further, the coordinates on the four corners of the image after distortion correction in the liquid crystal panel are denoted by A'(x1',y1'), B'(x2',y2'), C'(x3',y3'), D'(x4',y4') in the counterclockwise direction from the lower left, and the intersection point of the diagonal lines of the liquid crystal panel is denoted by E'(x5',y5').

Figure 2:
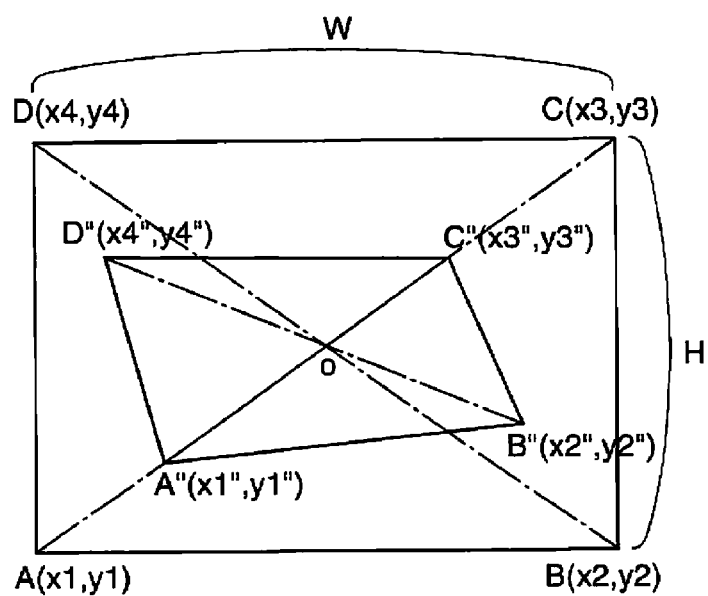
FIG. 2 shows a state that the origin of the image after distortion correction in the liquid crystal panel is moved to the center of the liquid crystal panel.

FIG. 2 shows a state that the origin of the image after distortion correction in the liquid crystal panel is moved to the center of the liquid crystal panel. Given that the above described point E is origin o, and when the image after distortion correction is moved so that the point E' may coincide with the origin o, the state shown in FIG. 2 is obtained. The number of effective pixels in the horizontal direction of the liquid crystal panel is denoted by W, and the number of effective pixels in the vertical direction of the liquid crystal panel is denoted by H. In this case, A(x1,y1)=A(−W/2+1,−H/2+1), B(x2,y2)=B(W/2−1,−H/2+1), C(x3,y3)=C(W/2−1,H/2−1), D(x4,y4)=D(−W/2+1,H/2−1). Note that −1, +1 are added because nonuse of the outermost pixels of the liquid crystal panel is specified, but −1, +1 are not necessarily added.

Further, the coordinates on the four corners of the image after distortion correction and moving in the liquid crystal panel are denoted by A"(x1",y1"), B"(x2",y2"), C"(x3",y3"), D"(x4",y4") in the counterclockwise direction from the lower left. In this case, the former image after distortion correction is moved by −x5' in the horizontal direction and by y5' in the vertical direction, and thus, A"(x1",y1")=A"(x1'−x5',y1'+y5'), B"(x2",y2")=B"(x2'−x5',y2'+y5'), C"(x3",y3")=C"(x3'−x5',y3'+y5'), D"(x4",y4")=D"(x4'−x5',y4'+y5') hold.

The coordinates on the four corners of the image after distortion correction A'(x1',y1'), B'(x2',y2'), C'(x3',y3'), D'(x4',y4') are obtained by a projection angle or the like, the coordinates of the intersection point of the diagonal lines E'(x5',y5') are obtained from the coordinates on the four corners, and the numbers of effective pixels H, W are known. Therefore, the projector can provide correspondences between the coordinates and perform interpolation calculation or the like even when the origin of the image after distortion correction is moved to the center of the liquid crystal panel.

Figure 3:
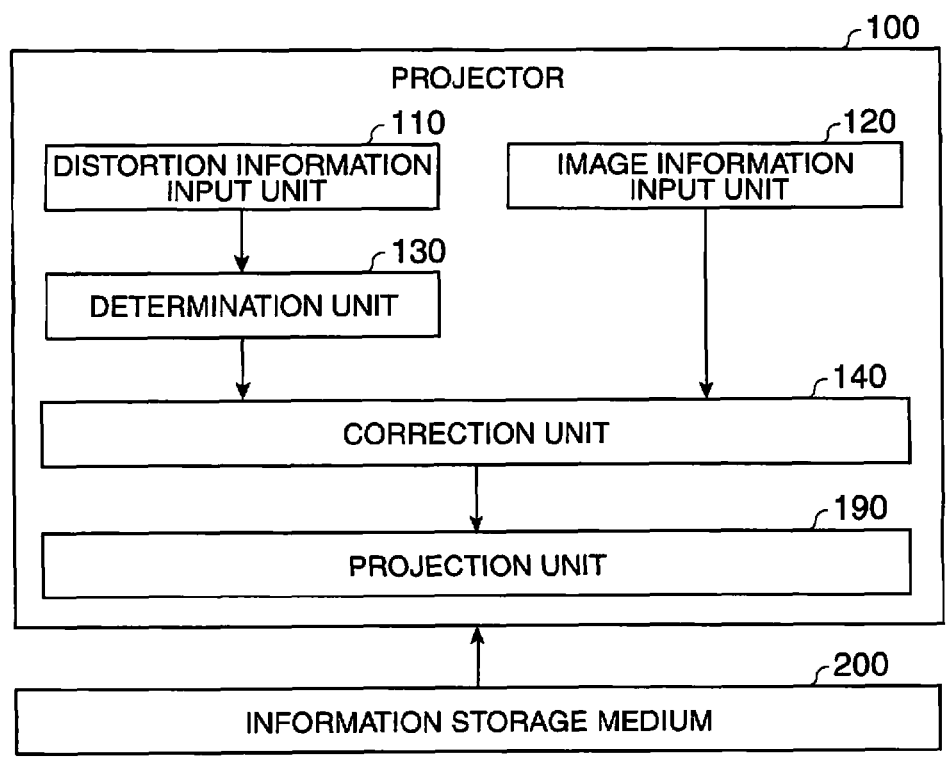
FIG. 3 is a functional block diagram of a projector in the embodiment.

Next, functional blocks of the projector having the above described functions will be described. FIG. 3 is a functional block diagram of a projector 100 in the embodiment. The projector 100 includes an image information input unit 120 that inputs image information (e.g., RGB signals or the like), a distortion information input unit 110 that inputs distortion information on distortion of a projected image, a determination unit 130 that determines a distortion state of the projected image based on the distortion information, a correction unit 140 that corrects the distortion of the image according to the distortion state, and a projection unit 190 that projects the image after distortion correction.

These respective units may be the following hardware. For example, the distortion information input unit 110 may be a CCD sensor for imaging the area containing the image projected on the screen, a button for inputting operation information when the image projected on the screen containing distortion is operated to correct to the state without distortion, an angle sensor that measures the projection angle, a distance sensor that measures the projection distance, etc. Further, the image information input unit 120 may be an image signal input terminal or the like, the determination unit 130 may be a CPU or the like, the correction unit 140 may be an image processing circuit or the like, and the projection unit 190 may be a lamp, liquid crystal panel, liquid crystal drive circuit, projection lens, or the like.

Further, a computer of the projector 100 may mount the functions of the determination unit 130 etc. by reading programs from an information storage medium 200. As the information storage medium 200, for example, a CD-ROM, DVD-ROM, ROM, RAM, HDD, or the like may be applied, and the reading method of programs may be a contact method or non-contact method.

Figure 4:
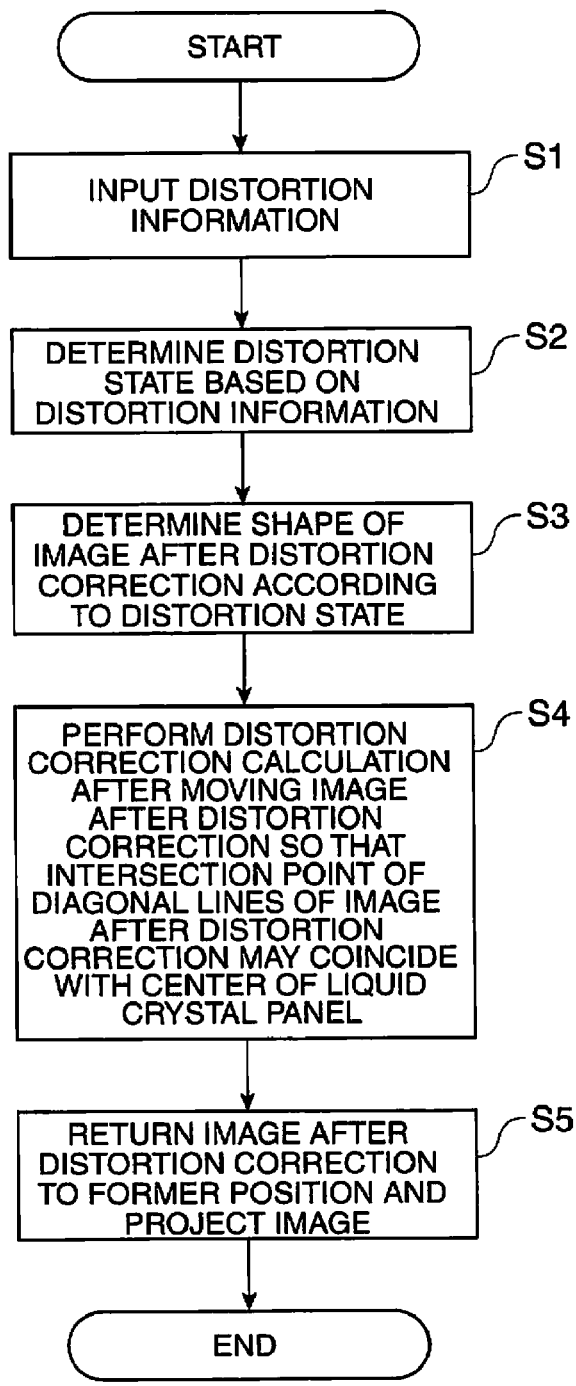
FIG. 4 is a flowchart showing a processing procedure of image distortion correction in the embodiment.

Next, a processing procedure of performing image distortion correction using the correction unit 140 etc will be described. FIG. 4 is a flowchart showing the processing procedure of image distortion correction in the embodiment. First, the distortion information input unit 110 inputs distortion information by one of the above described methods (the method using the CCD sensor for imaging the projected image, the method of inputting correction operation information by a user, the method of measuring using the angle sensor and the distance sensor) (step S1). The projector 100 may project a calibration image (e.g., a wholly white image, image representing correction designation, or the like) prior to the processing at step S1.

The determination unit 130 determines a distortion state of the projected image based on the distortion information from the distortion information input unit 110 (step S2). The correction unit 140 determines the shape of the image after distortion correction (e.g., A', B', C', D' or the like shown in FIG. 1) according to the distortion state (step S3). More specifically, in the case of the method of obtaining the coordinates of A', B', C', D' based on the projection angle and the projection distance, for example, the correction unit 140 first calculates three-dimensional coordinate values on the four corners in the rectangular screen surface having the maximum rectangle that can include the image projected on the screen (also containing images outside of the screen) and laterally symmetric with respect to the horizontal short side at the same aspect ratio as the aspect ratio of the liquid crystal panel. Then, the correction unit 140 calculates the three-dimensional coordinate values on the four corners in the above described rectangle in the condition that the liquid crystal panel is projected on the surface inclined by the projection angle with the projection optical axis being the normal line. Then, the correction unit 140 can obtain the three-dimensional coordinate values of the coordinates A', B', C', D' by calculating the three-dimensional coordinate values on the four corners in the rectangle after the liquid crystal panel is returned to the condition with no inclination in the surface, and can obtain two-dimensional coordinate values thereof.

Furthermore, as shown in FIG. 2, the correction unit 140 performs distortion correction calculation with the intersection point as the origin after moving the image after distortion correction so that the intersection point of the diagonal lines of the image after distortion correction may coincide with the center of the liquid crystal panel (step S4). Specifically, for example, the correction unit 140 performs image interpolation using an interpolation method such as the bilinear method. In addition, the correction unit 140 may perform image color correction, image brightness correction, or the like.

The correction unit 140 returns the image after image interpolation and the like to the position shown in FIG. 1. The projection unit 190 projects the image by a typical method of projecting the image after distortion correction (step S5).

Figure 5:
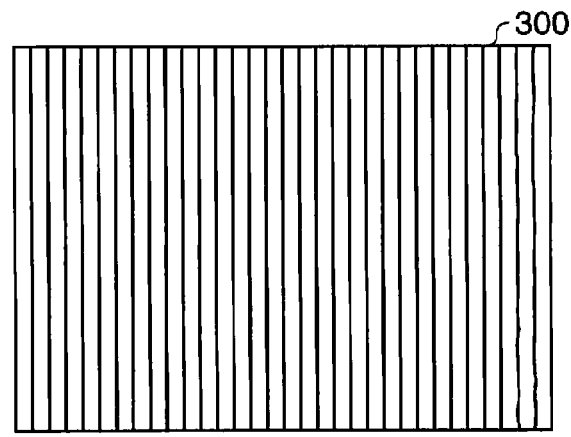
FIG. 5 shows a projected pattern image in a related art.
Figure 6:
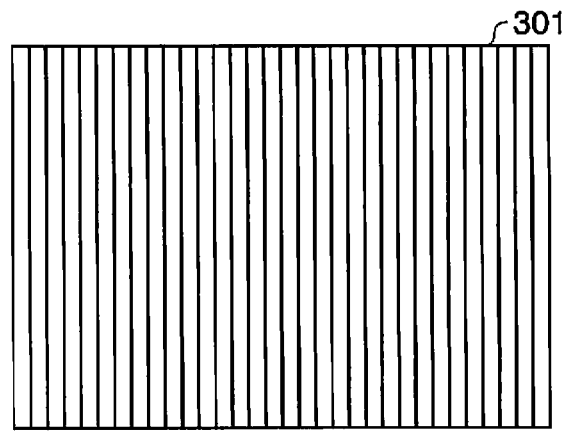
FIG. 6 shows a pattern image in the embodiment.

FIG. 5 shows a projected pattern image 300 in a related art. Further, FIG. 6 shows a pattern image 301 in the embodiment. As seen from the comparison between FIGS. 5 and 6, part of the projected pattern image 300 may be distorted according to the technique in the related art.

On the other hand, according to the embodiment, since the projector 100 performs distortion correction calculation with the intersection point of diagonal lines of the image or the like as the origin, the projector can perform the calculation nearly in the laterally and vertically symmetric condition with respect to the origin and the calculation in the condition that the distances from the origin to apexes of the image of interest are nearly equal when the shape of the image after distortion correction is nearly the rectangular shape. Therefore, the calculation error can be reduced and the image without distortion of pattern or the like as the pattern image 301 can be generated.

Further, according to the embodiment, since the intersection point of the diagonal lines of the image or the like corresponds to a position near the center of the projected image, the projector 100 performs distortion correction calculation with the intersection point of diagonal lines of the image or the like as the origin, and thereby, the projector can project even the pattern image 301 having the laterally symmetric pattern while maintaining the symmetry, prevent the occurrence of partial distortion as in the case of the pattern image 300 in the related art, and improve the image quality.

Furthermore, according to the embodiment, the projector 100 can reduce the amount of calculation and perform more efficient calculation by performing distortion correction calculation while making the origin coincide with the center of the liquid crystal panel.

Other Embodiments

The application of the disclosure is not limited to the above described embodiment, but various changes can be made. For example, although the intersection point of diagonal lines of the image after distortion correction is used as the origin in the above described embodiment, the position of the origin is not limited to the intersection point of the diagonal lines.

Figure 7:
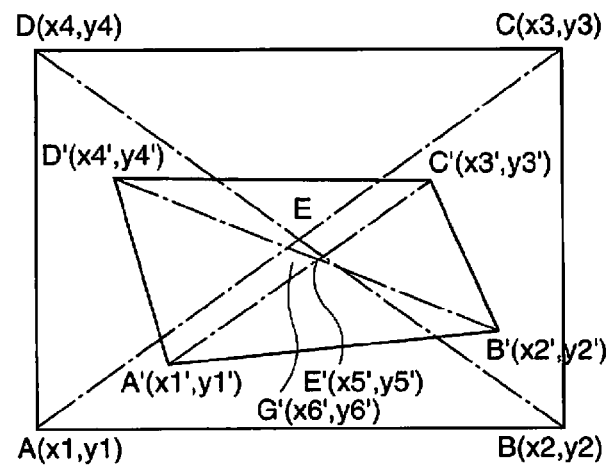
FIG. 7 shows a center of gravity of the image after distortion correction in the liquid crystal panel.

FIG. 7 shows the center of gravity G' of the image after distortion correction in the liquid crystal panel. For example, as shown in FIG. 7, the center of gravity G'(x6',y6') of the image after distortion correction may be used as the origin. As seen from the comparison between FIGS. 1 and 7, even when the shape of the image after distortion correction is distorted in both vertical and horizontal directions, the center of gravity G' is in a position at equal distances to the respective apexes D' and B', and A' and C', the calculation error is less likely to be caused, and thus, the projector 100 can project appropriate images.

Further, although the correction unit 140 performs distortion correction calculation after moving the intersection point of the diagonal lines of the image after distortion correction to the center of the liquid crystal panel, the unit may perform the distortion correction calculation without moving the intersection point of the diagonal lines of the image after distortion correction.

Furthermore, the projector 100 is not limited to the liquid crystal projector, but may be a projector using DMD (Digital Micromirror Device). The DMD is a registered trademark of Texas Instruments, Inc., U.S. Additionally, the function of the projector 100 may be distributed and mounted in plural devices (e.g., PC and projector, or the like).

What is claimed is:

1. An image processing system comprising:
a determination unit that determines a distortion state of a projected image; and
a correction unit that performs distortion correction of the image according to the distortion state,
wherein:
a shape of the image in a display area of an optical modulator after distortion correction has four apexes and is distorted from a shape of the image in the display area of the optical modulator before distortion correction in both vertical and horizontal directions,
the correction unit performs distortion correction calculation using a center of gravity of the image after distortion correction in the display area of the optical modulator as the origin, the center of gravity being located at equal distances to each of the four apexes of the image after distortion correction in the display area of the optical modulator, and
the correction unit performs the distortion correction calculation after moving the image in the display area of the optical modulator after distortion correction so that the origin of the image in the display area of the optical modulator after distortion correction coincides with a center of the display area of the optical modulator.

2. A projector comprising:
the image processing system according to claim 1; and
a projection unit that projects the image after distortion correction by the correction unit.

3. An image processing method, comprising:
determining a distortion state of a projected image; and
correcting the distortion of the image according to the distortion state,
wherein:
a shape of the image in a display area of an optical modulator after distortion correction has four apexes and is distorted from a shape of the image in the display area of the optical modulator before distortion correction in both vertical and horizontal directions,
the distortion correction calculation uses a center of gravity of the image after distortion correction in the display area of the optical modulator as the origin, the center of gravity being located at equal distances to each of the four apexes of the image after distortion correction in the display area of the optical modulator; and
the distortion correction calculation is performed after the image is moved in the display area of the optical modulator after distortion correction so that the origin of the image in the display area of the optical modulator after distortion correction coincides with a center of the display area of the optical modulator.

4. A computer program product embodied in at least one computer readable medium and comprising computer instructions executable by a computing device to perform the function of:
determining a distortion state of a projected image; and
correcting the distortion of the image according to the distortion state,
wherein:
a shape of the image in a display area of an optical modulator after distortion correction has four apexes and is distorted from a shape of the image in the display area of the optical modulator before distortion correction in both vertical and horizontal directions,
the distortion correction calculation uses a center of gravity of the image after distortion correction in the display area of the optical modulator as the origin, the center of gravity being located at equal distances to each of the four apexes of the image after distortion correction in the display area of the optical modulator; and
the distortion correction calculation is performed after the image is moved in the display area of the optical modulator after distortion correction so that the origin of the image in the display area of the optical modulator after distortion correction coincides with a center of the display area of the optical modulator.

* * * * *